United States Patent

(12) United States Patent
Otaka

(10) Patent No.: US 11,204,604 B2
(45) Date of Patent: Dec. 21, 2021

(54) REMOTE DRIVING MANAGING APPARATUS AND COMPUTER-READABLE STORAGE MEDIUM

(71) Applicant: HONDA MOTOR CO.,LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 16/439,739

(22) Filed: Jun. 13, 2019

(65) Prior Publication Data
US 2019/0384277 A1    Dec. 19, 2019

(30) Foreign Application Priority Data
Jun. 15, 2018    (JP) .............................. JP2018-114474

(51) Int. Cl.
*G05D 1/00*    (2006.01)
*H04W 4/48*    (2018.01)

(52) U.S. Cl.
CPC ............ *G05D 1/0022* (2013.01); *H04W 4/48* (2018.02); *G05D 2201/0213* (2013.01)

(58) Field of Classification Search
CPC ......... G05D 1/0022; G05D 2201/0213; G05D 1/0027; G05D 1/0038; G05D 2201/0212; H04W 4/48; H04W 4/44; H04W 12/04
See application file for complete search history.

(56) References Cited

U.S. PATENT DOCUMENTS

| | | | | |
|---|---|---|---|---|
| 9,640,066 | B2* | 5/2017 | Sinaguinan | H04M 1/72415 |
| 9,643,619 | B2* | 5/2017 | Sinaguinan | G06F 9/44505 |
| 2013/0274997 | A1* | 10/2013 | Chien | H04W 76/00 701/36 |
| 2014/0005859 | A1* | 1/2014 | Baskin | G07C 9/00309 701/2 |
| 2014/0229035 | A1* | 8/2014 | Rector | H04W 28/18 701/2 |
| 2015/0019266 | A1* | 1/2015 | Stempora | G06Q 40/08 705/4 |
| 2017/0021764 | A1* | 1/2017 | Adams | G07C 5/0825 |
| 2017/0084169 | A1* | 3/2017 | Sinaguinan | G08C 17/02 |
| 2017/0329341 | A1* | 11/2017 | Rakshit | G08G 1/143 |

(Continued)

FOREIGN PATENT DOCUMENTS

| | | |
|---|---|---|
| JP | 2000311299 A | 11/2000 |
| JP | 2004206218 A | 7/2004 |

*Primary Examiner* — Mussa A Shaawat

(57) ABSTRACT

A remote driving managing apparatus is provided, including a request information receiving unit configured to receive, from a communication terminal of a user of a vehicle, request information for requesting for remote driving of the vehicle, a determining unit configured to associate the vehicle with a user of the remote driving apparatus that is to remotely drive the vehicle based on the request information, a key data generating unit configured to generate, based on vehicle identification information for identifying the vehicle, key data for enabling to remotely drive the vehicle via a remote driving apparatus of a user associated with the vehicle by the determining unit, and a key data sending unit configured to send the key data to a communication terminal of the user associated with the vehicle by the determining unit.

19 Claims, 9 Drawing Sheets

(56) References Cited

U.S. PATENT DOCUMENTS

| | | | |
|---|---|---|---|
| 2018/0061415 A1* | 3/2018 | Penilla | G01C 21/3641 |
| 2018/0074490 A1* | 3/2018 | Park | G05D 1/0016 |
| 2019/0228367 A1* | 7/2019 | Longo | G06Q 10/063112 |
| 2019/0333382 A1* | 10/2019 | Heyl | H04W 4/44 |
| 2019/0371176 A1* | 12/2019 | Montemurro | H04L 63/20 |
| 2020/0004240 A1* | 1/2020 | Biehler | G05D 1/0212 |
| 2020/0334762 A1* | 10/2020 | Carver | G06Q 40/08 |

\* cited by examiner

REMOTE DRIVING MANAGING APPARATUS AND COMPUTER-READABLE STORAGE MEDIUM

The contents of the following Japanese patent application are incorporated herein by reference:
NO. 2018-114474 filed in JP on Jun. 15, 2018

BACKGROUND

1. Technical Field

The present invention relates to a remote driving managing apparatus and a computer-readable storage medium.

2. Related Art

A technology to remotely drive a vehicle by an electric vehicle or to remotely drive a vehicle by a remote driving apparatus for remote driving has been known (for example, refer to Patent Documents 1 and 2).

PRIOR ART LITERATURE

Patent Document

[Patent Document 1] Japanese Patent Application Publication No. 2000-311299
[Patent Document 2] Japanese Patent Application Publication No. 2004-206218

SUMMARY

It is desirable to provide a technology that can improve vehicle security at the time of providing a remote driving service of the vehicle.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
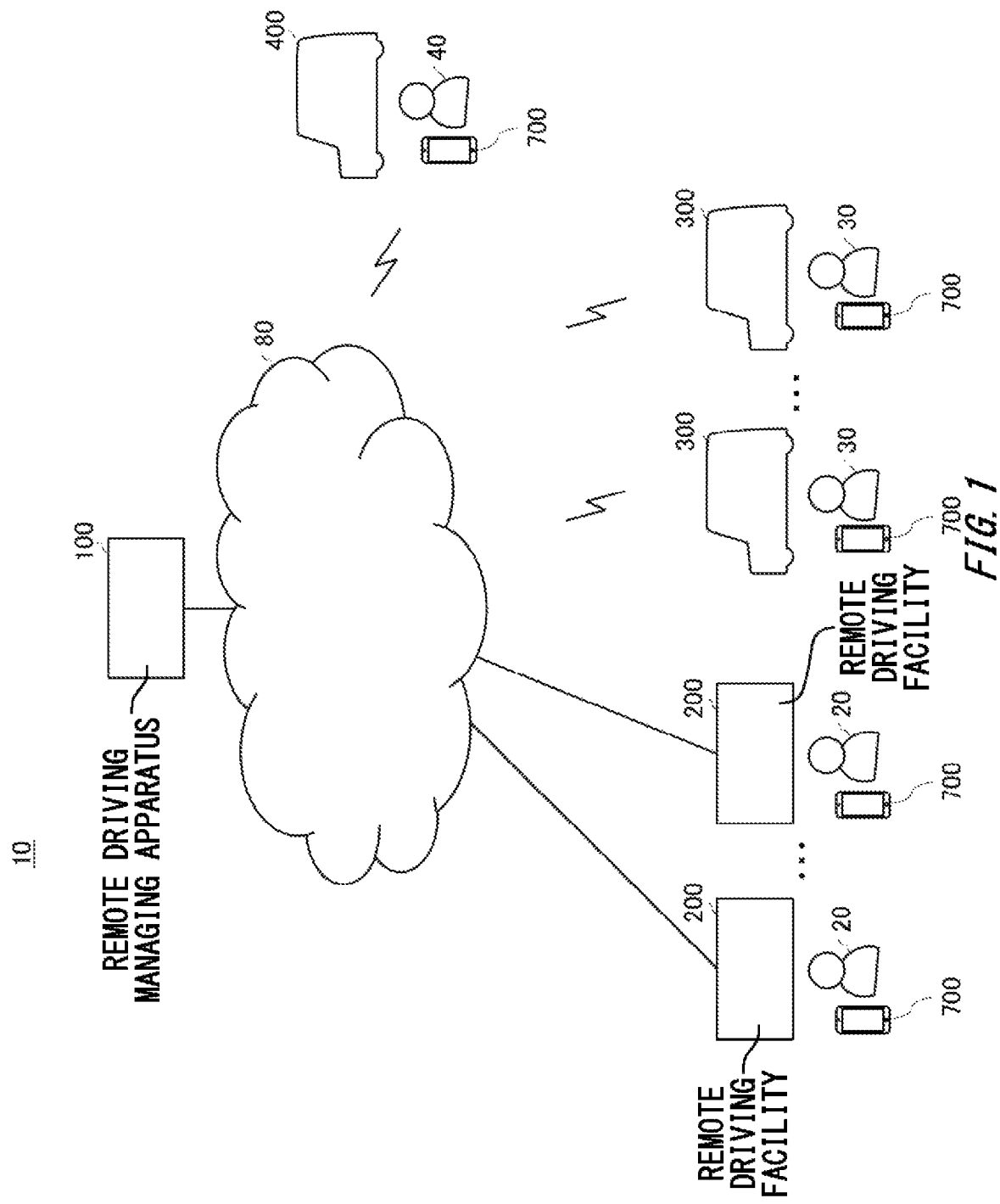
FIG. 1 schematically shows one example of a remote driving system 10.

FIG. 1 schematically shows one example of the remote driving system 10. The remote driving system 10 includes a remote driving managing apparatus 100, a plurality of remote driving facilities 200, a plurality of remote driving vehicles 300 and a vehicle 400. Although one vehicle 400 is illustrated in FIG. 1, there may be a plurality of vehicles 400.

The remote driving facility 200 is a facility for remotely driving the vehicle 400 through a network 80. The network 80 may be any network, and, for example, may include at least any one of the Internet, a mobile phone network such as so-called 3rd Generation (3G) network, Long Term Evolution (LTE), 4th Generation (4G) network and 5th Generation (5G) network, a public wireless Local Area Network (LAN) and a dedicated network.

The remote driving facility 200 is a facility mocking a driver seat of an automobile, for example. The remote driving facility 200 has a manipulating unit that accepts manipulation by a user 20 of the remote driving facility 200, and a communication unit that sends, to the vehicle 400, a control signal corresponding to the manipulation made on the manipulating unit. The remote driving facility 200 is one example of a remote driving apparatus. The manipulating unit includes a manipulating member that is required for driving the vehicle, such as a steering wheel, an accelerator pedal, a brake pedal, a shift lever and a blinker lever. Also, the manipulating unit may also further include a manipulating member for manipulating equipment such as a car navigation system, an air conditioner, an audio, a slide door, a sunroof and a seat heater. The communication unit receives an image that is of a surrounding area of the vehicle 400 and that is captured by an image capturing unit included in the vehicle 400. The remote driving facility 200 has a display unit that displays an image that is of the surrounding area of the vehicle 400 and that is received by the communication unit. The user 20 manipulates the manipulating unit while viewing the image displayed on the display unit, thereby achieving remote driving of the vehicle 400.

The remote driving vehicle 300 is an automobile that has a remote driving function of remotely driving the vehicle 400 through the network 80. Driving (described as manual driving in some cases) may be possible on the remote driving vehicle 300 by manipulating a manipulating unit included in the remote driving vehicle 300. Also, so-called automated driving may also be possible on the remote driving vehicle 300.

The remote driving vehicle 300 has a manipulating unit that accepts manipulation by a user 30 of the remote driving vehicle 300, and a communication unit that communicates with the vehicle 400 and the remote driving managing apparatus 100. The remote driving vehicle 300 is one example of a remote driving apparatus. The manipulating unit includes a manipulating member required for driving of the vehicle, such as a steering wheel, an accelerator pedal, a brake pedal, a shift lever and a blinker lever. Also, the manipulating unit may further include a manipulating member for manipulating equipment such as an air conditioner, an audio, a car navigation system, a slide door, a sunroof and a seat heater. The communication unit receives an image that is of a surrounding area of the vehicle 400 and that is captured by an image capturing unit included in the vehicle 400. The remote driving vehicle 300 has a display unit that displays an image that is of a surrounding area of the vehicle 400 and that is received by the communication unit. The remote driving vehicle 300 has, for example, a manual driving mode and a remote driving mode. The remote driving vehicle 300 travels according to manipulation made on the manipulating unit in the manual driving mode, and sends, to the vehicle 400, a signal corresponding to the manipulation made on the manipulating unit in the remote driving mode. The user 30 can remotely drive the vehicle 400 by switching the mode of the remote driving vehicle 300 that is, for example, parked in a parking area of the user 30's own home to the remote driving mode.

The vehicle 400 is an automobile that can be remotely driven by the remote driving facility 200 and the remote driving vehicle 300. In addition to being able to be remotely driven, the vehicle 400 can be manually driven. Also, automated driving may be possible on the vehicle 400. The vehicle 400 may have a manual driving mode in which the vehicle 400 travels according to a control signal based on manual driving, an automated driving mode in which the vehicle 400 travels according to a control signal based on automated driving, and a remotely driven mode in which the vehicle 400 travels according to a control signal based on remote driving.

In a case of the manual driving mode, the vehicle 400 travels according to manipulation made on the manipulating unit by a user 40. In a case of the automated driving mode, the vehicle 400 performs travelling, stopping, turning and the like of itself by using an apparatus, such as an image capturing unit and a radar that are provided to the vehicle 400, location information and map information independent of steering, accelerator pedal manipulation, brake pedal manipulation, gear change manipulation, and the like by the driver. In a case of the remotely driven mode, the vehicle 400 performs travelling, stopping, turning and the like according to a control signal received from the remote driving facility 200 or the remote driving vehicle 300.

The remote driving managing apparatus 100 provides a remote driving service to a plurality of users 40 of the vehicles 400. The remote driving managing apparatus 100 may provide the remote driving service to the user 40 who is registered with the service.

The remote driving managing apparatus 100 may store registration data of a plurality of users 40. The registration data may include identification information for identifying the user 40, attribute information of the user 40, identification information for identifying the vehicle 400 used by the user 40, vehicle information of the vehicle 400 and identification information for identifying a communication terminal 700 of the user 40. The communication terminal 700 may be a terminal carried by the user 40, and, for example, may be a mobile phone such as a smart phone, a tablet terminal, a personal computer (PC), and the like.

The attribute information of the user 40 may include basic information of the user 40. As examples of the basic information of the user 40, the name, the address, the date of birth, the age, the gender and the like of the user 40 are given.

The attribute information of the user 40 may include a driving style of the user 40. The driving style of the user 40 indicates a driving tendency of the user 40. As examples of the driving style, a driving speed tendency, a tendency of the number of times of acceleration/deceleration, a bypath utilization tendency, a side trip tendency and the like are given.

The driving speed tendency indicates a tendency of travelling speed of a vehicle in a case where the user 40 drives the vehicle. For example, the driving speed tendency indicates whether the driving speed is faster or slower than an average one. As a specific example, the driving speed tendency is represented by levels such as fast, slightly fast, average, slightly slow and slow. Stages of the levels are not limited to five stages and may be stages in any number.

The tendency of the number of times of acceleration/deceleration indicates a tendency of the number of times of acceleration and deceleration in a case where the user 40 drives the vehicle. Generally, as the number of times of acceleration/deceleration is larger, it is determined in many cases that the driving is rough. For example, the tendency of the number of times of acceleration/deceleration indicates whether the number of times of acceleration/deceleration is larger or smaller than an average one. As a specific example, the tendency of the number of times of acceleration/deceleration is represented by levels such as large, slightly large, average, slightly small and small. Stages of the levels are not limited to five stages and may be stages in any number.

The bypath utilization tendency indicates a utilization tendency of a bypath in a case where the user 40 drives the vehicle. For example, the bypath utilization tendency indicates whether the bypath utilization tendency is higher or lower than an average one. As a specific example, the bypath utilization tendency is represented by levels such as high, slightly high, average, slightly low and low. Stages of the levels are not limited to five stages and may be stages in any number.

The side trip tendency indicates a tendency of taking a side trip in a case where the user 40 drives the vehicle. For example, the side trip tendency indicates whether the number of times for taking a side trip until arriving at a destination is higher or lower than an average one. As a specific example, the side trip tendency is represented by levels such as high, slightly high, average, slightly low and low. Stages of the levels are not limited to five stages and may be stages in any number.

The attribute information of the user 40 may include a driving history of the user 40. The driving history of the user 40 includes various histories in a case where the user 40 drives the vehicle. As examples of the driving history of the user 40, a driving time period, a driving time point, a location of the vehicle at each time point, a speed of the vehicle, manipulation contents by the user 40 and the like are given. As examples of the manipulation contents, steering wheel manipulation amount, an accelerator pedal stepping amount, a brake pedal stepping amount, the number of times of acceleration/deceleration and the like are given. The driving history of the user 40 may also include history of an area in which the user 40 drives and causes the vehicle to travel, a history of a time period during which the user 40 drives and causes the vehicle to travel, a history of a destination to which the user 40 drives and causes the vehicle to move, and the like.

The vehicle information may include a vehicle name of the vehicle. The vehicle name is, for example, a designation of the vehicle. The vehicle name may be a so-called pet name. Also, the vehicle name may also be a so-called marque.

The vehicle information may include a specification of the vehicle. The specification is a sign or a term that is used for distinguishing vehicles having the same designation by differences in interiors, exteriors, seats, transmissions and the like. The specification may also be information that is called a so-called grade.

The vehicle information may include a vehicle body style of the vehicle. The vehicle body style is a sign or a term used for indicating a style of the vehicle, and, for example, is information described in a vehicle body style column of a vehicle inspection certificate. As examples of the vehicle body style, a saloon, a convertible, a station wagon and the like are given. Also, the vehicle body style may also be information that is called a so-called body type. As examples of the body type, a sedan, a coupe, a compact car, an open-top car, a minivan, an estate car, a station wagon, a Sport Utility Vehicle (SUV), a light automobile and the like are given.

The vehicle information may include a vehicle model of the vehicle. The vehicle model may be a classification of structures or sizes of the vehicle. As examples of the vehicle model, a standard passenger car, a small passenger car, a light four-wheel passenger car, a small truck, a light four-wheel truck, a standard automobile, a small automobile, a light automobile, a large special automobile, a small special automobile and the like are given.

The vehicle information may include equipment information that indicates equipment of the vehicle. The equipment information indicates an optional equipment of the vehicle, for example. As examples of the optional equipment, a power sliding door, a sunroof, a seat heater, an air purifier and the like are given.

The remote driving managing apparatus 100 may cause a user of the remote driving apparatus registered with the remote driving service to remotely drive the vehicle 400. The remote driving managing apparatus 100 may store registration data of the user of the remote driving apparatus. The registration data may include identification information for identifying the user 20, attribute information of the user 20, identification information for identifying the remote driving facility 200 used by the user 20, identification information for identifying the communication terminal 700 of the user 20, and a time period during which the remote driving can be performed. Also, the registration data may include identification information for identifying the user 30, attribute information of the user 30, identification information for identifying the remote driving vehicle 300 used by the user 30, vehicle information of the remote driving vehicle 300, identification information for identifying the communication terminal 700 of the user 30, and a time period during which the remote driving can be performed. The attribute information of the user 20 and of the user 30 may be similar to the attribute information of the user 40. The vehicle information of the remote driving vehicle 300 may be similar to the vehicle information of the vehicle 400.

The time period during which the remote driving can be performed is a time period during which the user 20 and the user 30 can remotely drive the vehicle 400, and can be registered by the user 20 and the user 30, for example. The user 20 may register the time period during which the remote driving can be performed in the remote driving managing apparatus 100 via the remote driving facility 200. Also, the user 30 may register the time period during which the remote driving can be performed in the remote driving managing apparatus 100 via the remote driving vehicle 300. Also, the user 20 and the user 30 may also register, by the communication terminal 700, the time period during which the remote driving can be performed in the remote driving managing apparatus 100 via the network 80.

When receiving the request information for requesting for remote driving of the vehicle 400 and that is sent from the communication terminal 700 of the user 40, the remote driving managing apparatus 100 refers to each registration data and selects a user who is to remotely drive the vehicle 400.

The request information includes at least any one of the identification information of the user 40, the identification information of the communication terminal 700 of the user 40 and the identification information of the vehicle 400. The request information may include section information that indicates a travelling section in which the vehicle 400 travels by remote driving. The request information may include location information that indicates the location of the vehicle 400. The request information may include time information that indicates a time period during which the remote driving of the vehicle 400 is desired.

When it is desired to perform the remote driving from the user 40's home to a destination, for example, the user 40 of the vehicle 400 sends, to the remote driving managing apparatus 100, the request information including the section information that indicates a travelling section from the user 40's home to the destination, and the time information determined based on departure time and required time from the user 40's home to the destination. The required time from the user 40's home to the destination may be set by the user 40, may also be set by the communication terminal 700 of the user 40, and may also be set by a navigation apparatus included in the vehicle 400.

Also, for example, when the vehicle 40 is moved by manual driving on a path to the destination and when the remote driving is desired on a partial section of the path, the user 40 of the vehicle 400 sends, to the remote driving managing apparatus 100, the request information including section information that indicates the section and time information that indicates a time period during which the vehicle travels on the section.

Also, for example, when the vehicle 400 is moved by automated driving to the destination and when a remote driving section that is a section in which the vehicle 400 travels by remote driving is included within the movement path, the vehicle 400 sends, to the remote driving managing apparatus 100, the request information including the section information that indicates the section and the time information that indicates a time period during which the vehicle 400 travels in the section. The remote driving section is, for example, a section in which the automated driving cannot be performed, a section in which the automated driving is prohibited, a section in which the automated driving is not proper, and the like.

When receiving a plurality of pieces of request information, with respect to each of the plurality of pieces of request information, the remote driving managing apparatus 100 selects a user of the remote driving apparatus who is to remotely drive the vehicle 400 and associates the selected user with the vehicle 400. For example, the remote driving managing apparatus 100 first refers to the time information included in the request information, and the time period during which the remote driving can be performed included in the registration data of the user of the remote driving apparatus, and specifies, as a candidate, a user having a time period during which the remote driving can be performed that includes a time period indicated by the time information. If there are a plurality of candidates, the remote driving managing apparatus 100 selects the user who is to remotely drive the vehicle 400 of the vehicle 400 and associates the selected user with the vehicle 400 based on the attribute information of the user 40 of the vehicle 400 and the attribute information of the plurality of the candidate users of the remote driving apparatuses.

Also, the remote driving managing apparatus 100 may also refer to the plurality of pieces of request information with respect to each of the plurality of users of the remote driving apparatuses, and select, from a plurality of users 40, a user 40 of the vehicle 400 that is to be remotely driven by the user of the remote driving apparatus, and associate the selected user 40 with the user of the remote driving apparatus. For example, the remote driving managing apparatus 100 first determines, as a target to be processed, one user among a plurality of users of the remote driving apparatuses registered with the service, and refers to the time period, during which the remote driving can be performed, of the one user and the time information included in the plurality of pieces of request information to specifies, as a candidate, an user 40 who has the time period, indicated in the time information, which is included in the time period during which the remote driving can be performed. If there are a plurality of candidates, the remote driving managing apparatus 100 selects a user 40 of a vehicle 400 that is to be remotely driven by one user of one remote driving apparatus based on the attribute information of the one user of the one remote driving apparatus, and the attribute information of the plurality of candidate users 40 of the vehicles 400, and associates the selected user 40 with the one user of the one remote driving apparatus.

After associating the user 40 of the vehicle 400 with the user of the remote driving apparatus, the remote driving managing apparatus 100 generates, based on the identification information of the vehicle 400, key data for enabling to remotely drive the vehicle 400 via the remote driving apparatus of the user. The remote driving managing apparatus 100 generates the key data that is valid only once, for example. The remote driving managing apparatus 100 may generate the key data by using any method.

The remote driving managing apparatus 100 sends the generated key data to the communication terminal 700 of the user of the remote driving apparatus. The user sends the key data to the remote driving apparatus via short-range radio communication from the communication terminal 700, for example.

The remote driving apparatus establishes connection with the vehicle 400 by using the received key data. The remote driving apparatus sends, to the vehicle 400, a control signal based on the remote driving by the user via the established connection. According to such a flow, the remote driving of the vehicle 400 is achieved by the user of the remote driving apparatus.

Figure 2:
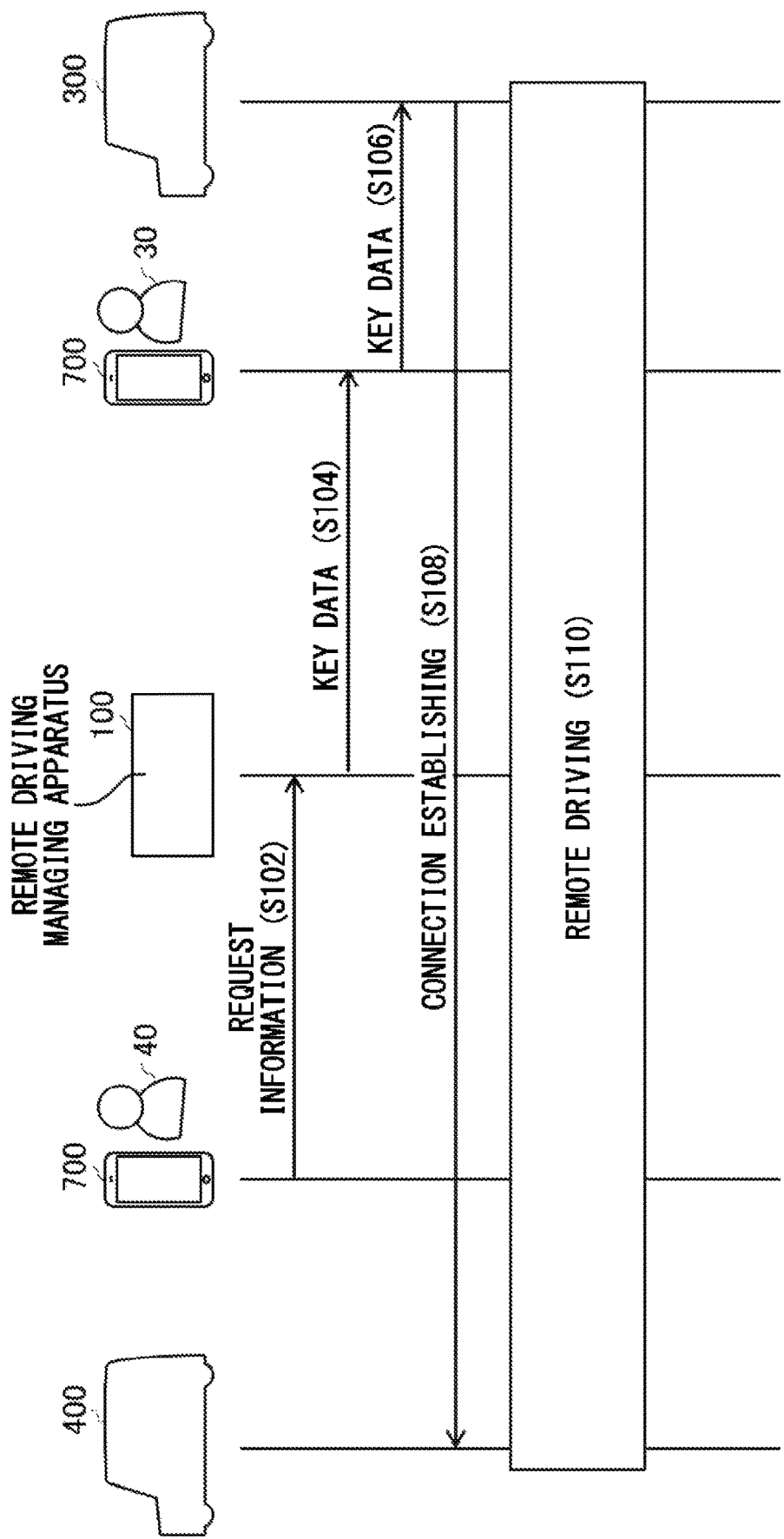
FIG. 2 schematically shows one example of a processing flow of the remote driving system 10.

FIG. 2 schematically shows one example of a processing flow of the remote driving system 10. Here, a processing flow is described from a time when the communication terminal 700 of the user 40 sends the request information to the remote driving managing apparatus 100 to a time when the remote driving of the vehicle 400 is performed.

In Step 102 (the term "Step" may be abbreviated to S), the communication terminal 700 sends, to the remote driving managing apparatus 100, the request information according to an instruction of the user 40. The remote driving managing apparatus 100 selects the user who is to remotely drive the vehicle 400 based on the received request information. Here, a case where the user 30 of the remote driving vehicle 300 is selected is given as an example.

In S104, the remote driving managing apparatus 100 generates the key data based on the identification information of the vehicle 400 and sends the generated key data to the communication terminal 700 of the user 30. In S106, the communication terminal 700 sends the key data to the remote driving vehicle 300. For example, short-range radio communication, such as Near Field Communication (NFC), Felica (registered trademark), Bluetooth (registered trademark) and the like, is possible between the communication terminal 700 and the remote driving vehicle 300. The communication terminal 700 sends the key data to the remote driving vehicle 300 by the short-range radio communication.

In S108, the remote driving vehicle 300 establishes the connection with the vehicle 400 by using the key data received in S106. In S110, the remote driving vehicle 300 is remotely driven by the vehicle 400 via the connection established in S108. The vehicle 400 sends, to the remote driving vehicle 300, an image that is of a surrounding area of the vehicle 400 and that is captured by an image capturing unit, and the remote driving vehicle 300 sends a control signal based on the remote driving to the vehicle 400.

Figure 3:
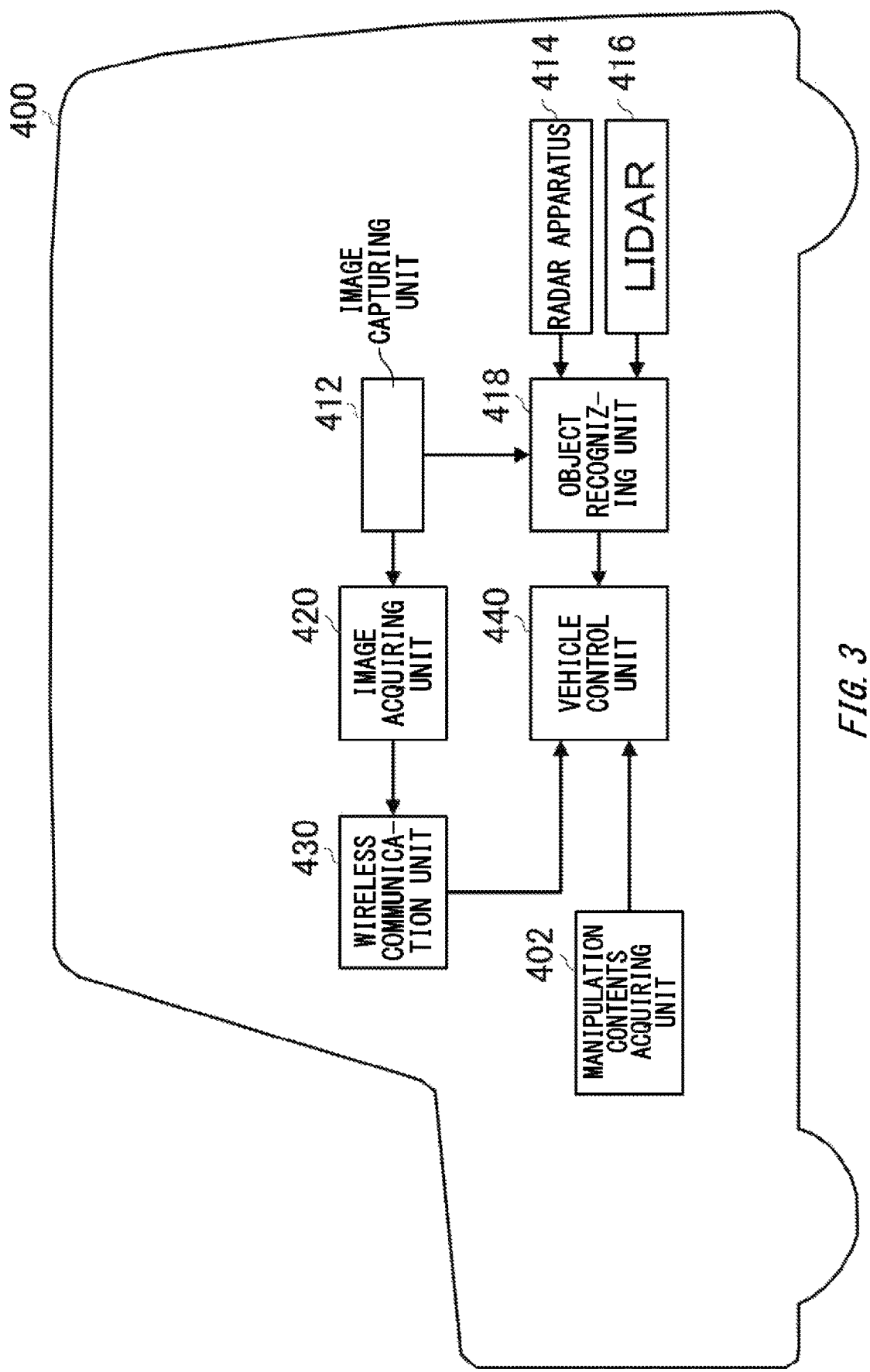
FIG. 3 schematically shows one example of a functional configuration of a vehicle 400.

FIG. 3 schematically shows one example of a functional configuration of the vehicle 400. The vehicle 400 includes a manipulation contents acquiring unit 402, an image capturing unit 412, a radar apparatus 414, a Light Detection and Ranging (LIDAR) 416, an object recognizing unit 418, an image acquiring unit 420, a wireless communication unit 430 and a vehicle control unit 440.

The manipulation contents acquiring unit 402 acquires the manipulation contents to a manipulating unit included in the vehicle 400. For example, the manipulation contents acquiring unit 402 acquires a steering angle of the steering wheel, a stepping operation amount of the accelerator pedal, a stepping operation amount of the brake pedal and the like.

The image capturing unit 412 is a digital camera utilizing a solid-state imaging device such as Charge Coupled Device (CCD) or Complementary Metal Oxide Semiconductor (CMOS), for example. One or more image capturing units 412 are provided to any position of the vehicle 400. When capturing an image of the front area, the image capturing unit 412 is provided to an upper portion of a front windshield, a back surface of a room mirror, or the like. When a plurality of image capturing units 412 are provided, the plurality of image capturing units 412 may capture images in different directions. The image capturing unit 412 periodically and repeatedly captures images of the surrounding area of the vehicle 400, for example. The image capturing unit 412 may be a stereo camera.

The radar apparatus 414 radiates radio waves such as a millimeter wave and the like toward areas surrounding the vehicle 400, and detects a radio wave (reflected wave) reflected by an object to detect at least a location (a distance and a direction) of the object. One or more of radar apparatuses 414 are provided to any position of the vehicle 400. The radar apparatus 414 may also detect a location and a speed of the object by a Frequency Modulated Continuous Wave (FM-CW) manner.

The LIDAR 416 emits light toward areas surrounding the vehicle 400 to measure scattered light. The LIDAR 416 detects a distance to a target based on a period of time from light emission to light reception. The emitted light is, for example, pulse laser light. One or more LIDARs 416 are provided to any position of the vehicle 400.

The object recognizing unit 418 recognizes a location, a type, a speed and the like of the object based on a detection result by some or all of the image capturing unit 412, the radar apparatus 414 and the LIDAR 416. The object recognizing unit 418 outputs the recognition result to the vehicle control unit 440. Also, if necessary, the object recognizing unit 418 may output, to the vehicle control unit 440, the detection results by the image capturing unit 412, the radar apparatus 414 and the LIDAR 416 as they are.

The image acquiring unit 420 acquires an image captured by the image capturing unit 412. The wireless communication unit 430 performs wireless communication with the remote driving managing apparatus 100, the remote driving facility 200 and the remote driving vehicle 300 via the network 80. In a case where the vehicle 400 is in a remotely driven mode, the wireless communication unit 430 sends the image acquired by the image acquiring unit 420 to the remote driving facility 200 or the remote driving vehicle 300. Also, in a case where the vehicle 400 is in a remotely driven mode, the wireless communication unit 430 receives a control signal based on remote driving from the remote driving facility 200 or the remote driving vehicle 300 and outputs the control signal to the vehicle control unit 440.

The vehicle control unit 440 controls the vehicle 400. The vehicle control unit 440 may have a location acquiring unit that acquires a location of the vehicle 400. The location acquiring unit receives location information of the vehicle 400 from the navigation apparatus included in the vehicle 400, for example. The navigation apparatus of the vehicle 400 has a Global Navigation Satellite System (GNSS) receiver, for example, and the GNSS receiver identifies the location of the vehicle 400 based on a signal received from a GNSS satellite. Note that the location acquiring unit may also have the GNSS receiver.

The vehicle control unit 440 may acquire destination information that indicates a destination of the vehicle 400 and path information that indicates the movement path to the destination. The vehicle control unit 440 acquires the destination information and the path information from the navigation apparatus included in the vehicle 400, for example.

The vehicle control unit 440 acquires first map information including at least map information of the movement path indicated by the path information. The vehicle control unit 440 receives the first map information from the navigation apparatus of the vehicle 400, for example. Also, the vehicle control unit 440 may also receive the first map information via the network 80 from a map management server that manages map information of various locations. The first map information is information in which shapes of roads are represented by links showing the roads and by nodes connected by the links, for example. The first map information may also include curvatures of the roads, Point Of Interest (POI) information or the like. The first map information may be updated at any time.

The vehicle control unit 440 may also further acquire second map information including at least map information of the movement path indicated by the path information. Similar to the first map information, the vehicle control unit 440 may receive the second map information from the navigation apparatus of the vehicle 400, or receive the second map information via the network 80. The second map information is map information with higher precision than the first map information. The second map information includes information of a center of a lane, information of a boundary between lanes or the like, for example. Also, the second map information may include road information, traffic regulation information and the like. The second map information may be updated at any time.

In a case where the vehicle 400 is in the automated driving mode, the vehicle control unit 440 may control the travelling of the vehicle 400 by using the location acquired by the location acquiring unit, the information received from the object recognizing unit 418 and the first map information. The vehicle control unit 440 may control the travelling of the vehicle 400 by further using the second map information. In a case where the vehicle 400 is in the manual driving mode, the vehicle control unit 440 may control the travelling of the vehicle 400 according to the manipulation contents acquired by the manipulation contents acquiring unit 402.

In a case where the vehicle 400 is in the remotely driven mode, the vehicle control unit 440 controls the travelling of the vehicle 400 according to the control signal received by the wireless communication unit 430 from the remote driving facility 200 or the remote driving vehicle 300.

Figure 4:
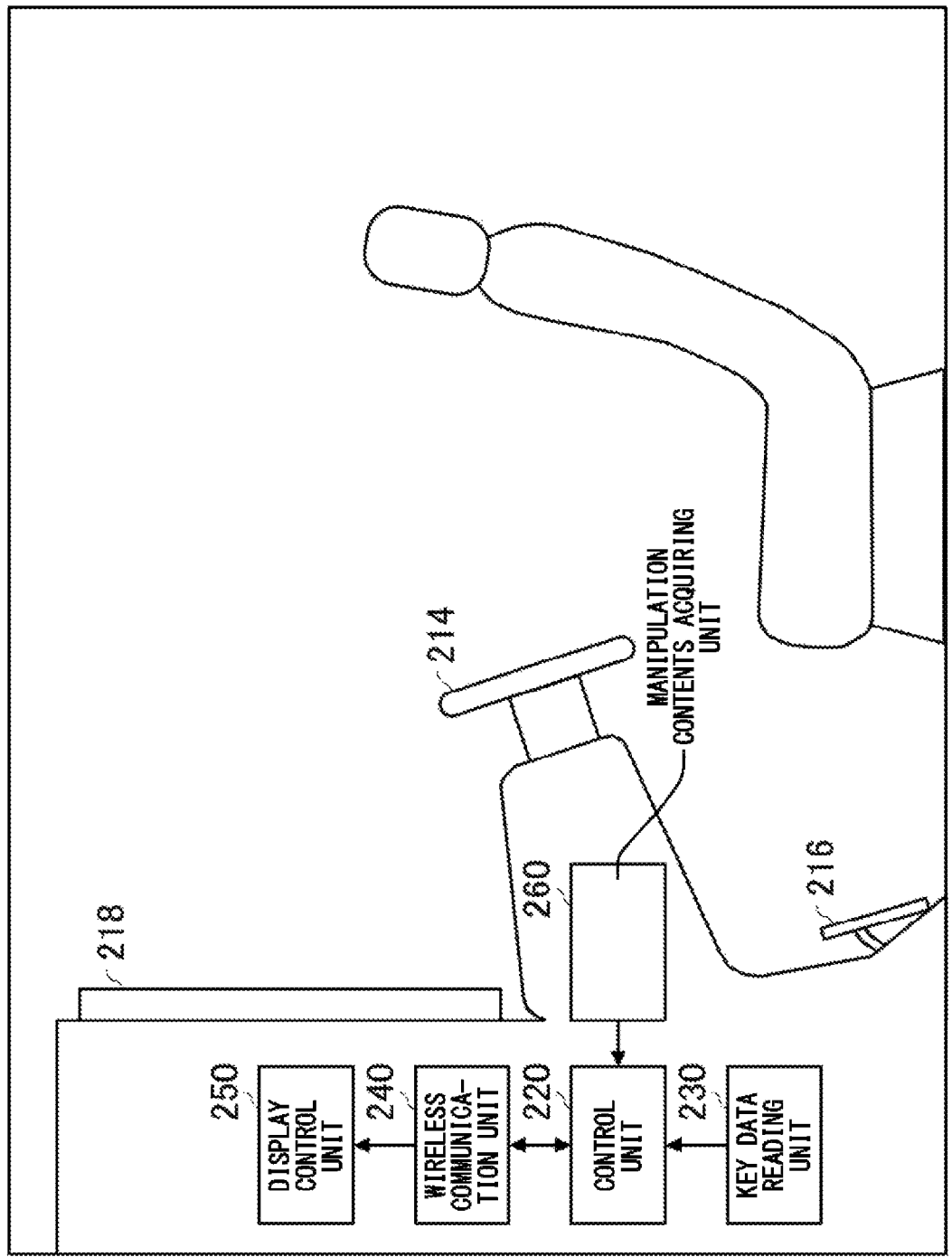
FIG. 4 schematically shows one example of a remote driving facility 200.

FIG. 4 schematically shows one example of a remote driving facility 200. In FIG. 4, the illustration of a manipulating member other than the steering wheel 214 and the pedal 216 is omitted.

The remote driving facility 200 includes a display unit 218, a control unit 220, a key data reading unit 230, a wireless communication unit 240, a display control unit 250 and a manipulation contents acquiring unit 260. The control unit 220 performs various types of control.

The key data reading unit 230 reads the key data from the communication terminal 700. The key data reading unit 230 may read the key data from the communication terminal 700 by the short-range radio communication.

The wireless communication unit 240 communicates with the remote driving managing apparatus 100. Also, the wireless communication unit 240 communicates with the vehicle 400. The wireless communication unit 240 may communicate with the vehicle 400 via the remote driving managing apparatus 100. Also, the wireless communication unit 240 may also communicate with the vehicle 400 via the network 80 without using the remote driving managing apparatus 100.

The manipulation contents acquiring unit 260 acquires the manipulation contents to the manipulating member of the remote driving facility 200. The manipulation contents acquiring unit 260 acquires the steering angle of the steering, the stepping operation amount of the pedal 216, and the like, for example.

When the key data reading unit 230 reads the key data, the control unit 220 controls the wireless communication unit 240 and uses the key data to establish the connection with the vehicle 400. After the connection with the vehicle 400 is established, the control unit 220 causes the wireless communication unit 240 to send, to the vehicle 400, a control signal corresponding to the manipulation contents acquired by the manipulation contents acquiring unit 260.

The wireless communication unit 240 receives an image sent by the wireless communication unit 430 of the vehicle 400. The display control unit 250 displays the image received from the vehicle 400 by the wireless communication unit 240 on the display unit 218. Note that the remote driving facility 200 may also include a projector and a screen instead of the display unit 218. In this case, the display control unit 250 may project, by the projector, the image received by the wireless communication unit 240 on the screen.

Figure 5:
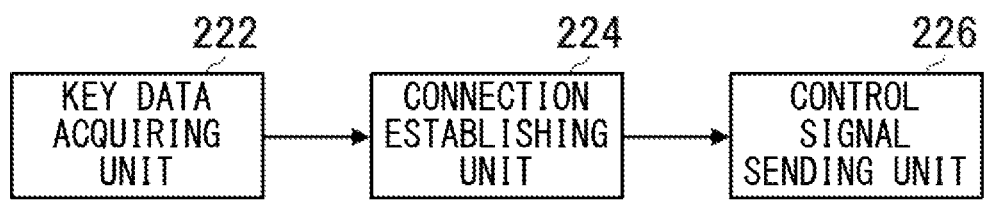
FIG. 5 schematically shows one example of a functional configuration that is implemented by a control unit 220.

FIG. 5 schematically shows one example of a functional configuration achieved by the control unit 220. The control unit 220 may function as a key data acquiring unit 222, a connection establishing unit 224 and a control signal sending unit 226.

The key data acquiring unit 222 acquires the key data. The key data acquiring unit 222 receives the key data from the key data reading unit 230. The connection establishing unit 224 uses the key data acquired by the key data acquiring unit 222 to establish the connection with the vehicle 400. The control signal sending unit 226 controls the wireless communication unit 240 so as to send, to the vehicle 400, a control signal corresponding to the manipulation contents acquired by the manipulation contents acquiring unit 260 via the connection established by the connection establishing unit 224.

Figure 6:
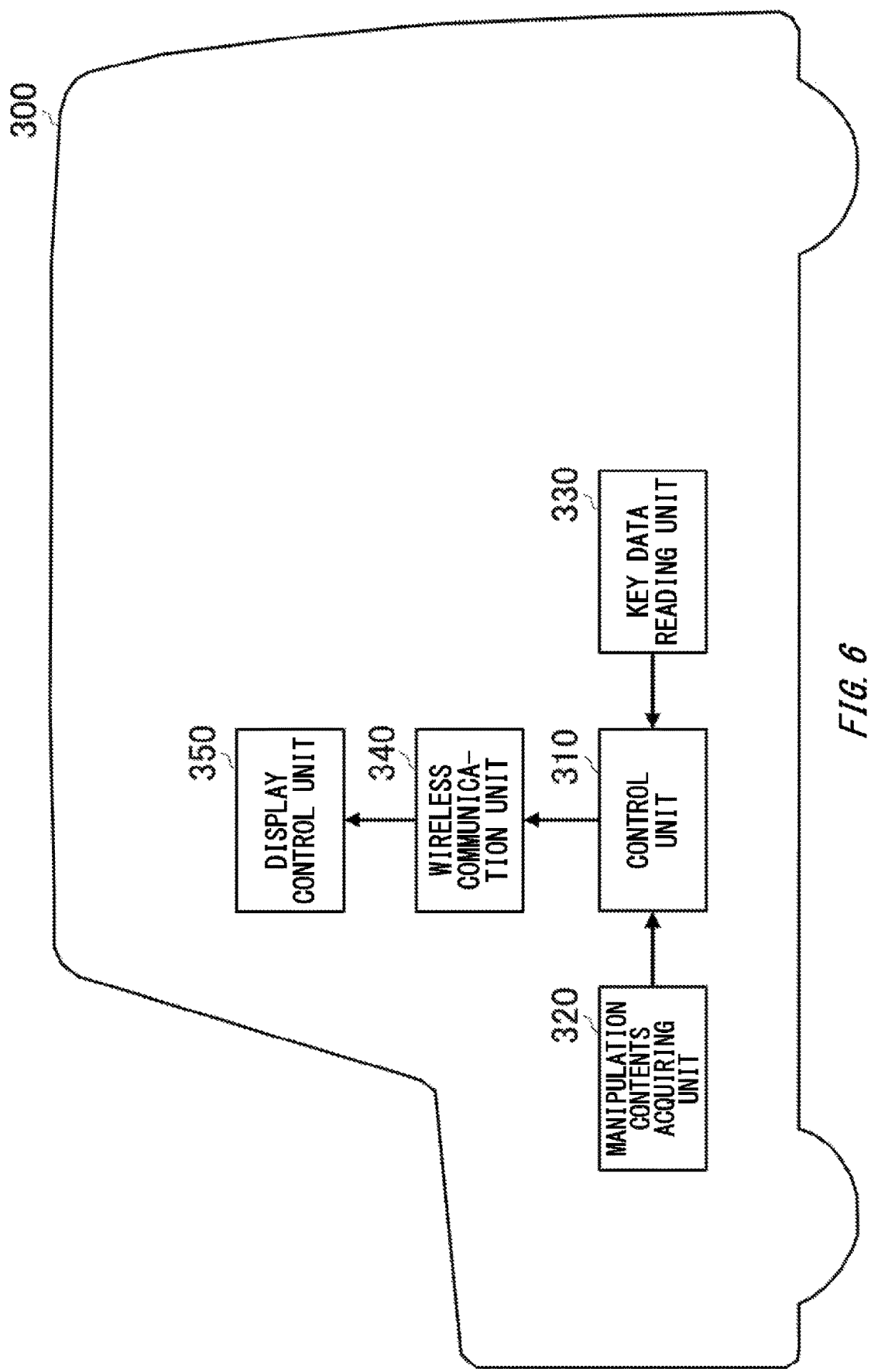
FIG. 6 schematically shows one example of a remote driving vehicle 300.

FIG. 6 schematically shows one example of the functional configuration of the remote driving vehicle 300. The remote driving vehicle 300 includes a control unit 310, a manipulation contents acquiring unit 320, a key data reading unit 330, a wireless communication unit 340 and a display control unit 350. The control unit 310 performs various types of control.

The manipulation contents acquiring unit 320 acquires the manipulation contents to the manipulating unit included in the remote driving vehicle 300 and outputs the acquired manipulation contents to the control unit 310. For example, the manipulation contents acquiring unit 320 acquires the steering angle of the steering, the stepping operation amount of the accelerator pedal, the stepping operation amount of the brake pedal, and the like. In a case where the remote driving vehicle 300 is in the manual driving mode, the control unit 310 controls the remote driving vehicle 300 according to the manipulation contents.

The key data reading unit 330 reads the key data from the communication terminal 700. The key data reading unit 330 may read the key data from the communication terminal 700 by the short-range radio communication.

The wireless communication unit 340 communicates with the remote driving managing apparatus 100. Also, the wireless communication unit 340 communicates with the vehicle 400. The wireless communication unit 340 may communicate with the vehicle 400 via the remote driving managing apparatus 100. Also, the wireless communication unit 340 may also communicate with the vehicle 400 via the network 80 without using the remote driving managing apparatus 100.

When the remote driving vehicle 300 is in the remote driving mode and when the key data reading unit 330 reads the key data, the control unit 310 controls the wireless communication unit 340 and uses the key data to establish the connection with the vehicle 400. After the connection with the vehicle 400 is established, the control unit 310 outputs, to the wireless communication unit 340, the control signal corresponding to the manipulation contents acquired by the manipulation contents acquiring unit 320. The wireless communication unit 340 sends the control signal to the vehicle 400 via the network 80.

The wireless communication unit 340 receives an image sent by the wireless communication unit 430 of the vehicle 400 and outputs the received image to the display control unit 350. The display control unit 350 causes the display unit included in the remote driving vehicle 300 to display the received image.

In a case where the automated driving can be performed on the remote driving vehicle 300, a similar configuration to the image capturing unit 412, the radar apparatus 414, the LIDAR 416 and the object recognizing unit 418 may further included.

Figure 7:
FIG. 7 schematically shows one example of a functional configuration that is implemented by a control unit 310.

FIG. 7 schematically shows one example of the functional configuration achieved by the control unit 310. The control unit 310 may function as a key data acquiring unit 312, a connection establishing unit 314 and a control signal sending unit 316.

The key data acquiring unit 312 acquires the key data. The key data acquiring unit 312 receives the key data from the key data reading unit 330. The connection establishing unit 314 uses the key data acquired by the key data acquiring unit 312 to establish the connection with the vehicle 400. The control signal sending unit 316 controls the wireless communication unit 340 so as to send, to the vehicle 400, a control signal corresponding to the manipulation contents acquired by the manipulation contents acquiring unit 320 via the connection established by the connection establishing unit 314.

Figure 8:
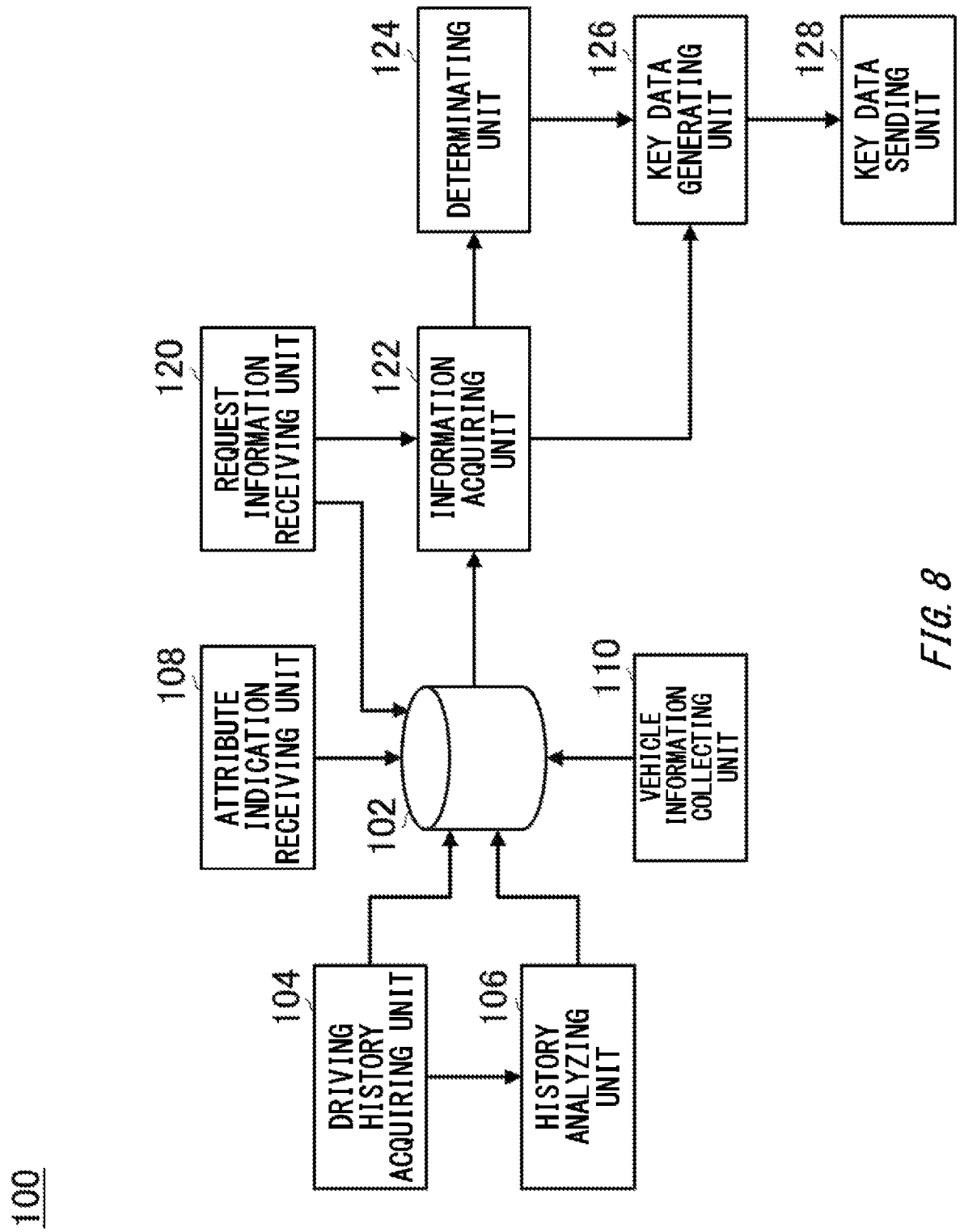
FIG. 8 schematically shows one example of a functional configuration of a remote driving managing apparatus 100.

FIG. 8 schematically shows one example of the functional configuration of the remote driving managing apparatus 100. The remote driving managing apparatus 100 includes a storage unit 102, a driving history acquiring unit 104, a history analyzing unit 106, an attribute indication receiving unit 108, a vehicle information collecting unit 110, a request information receiving unit 120, an information acquiring unit 122, a determining unit 124, a key data generating unit 126 and a key data sending unit 128. Note that the remote driving managing apparatus 100 does not necessarily include all of these components.

The storage unit 102 stores various types of information. The storage unit 102 stores the registration data of the user 40. Also, the storage unit 102 stores the registration data of the user 20. Also, the storage unit 102 stores the registration data of the user 30.

The driving history acquiring unit 104 acquires the driving history. The driving history acquiring unit 104 stores the acquired driving history in the storage unit 102.

The driving history acquiring unit 104 acquires the driving history of the user 40. The driving history acquiring unit 104 may regularly acquire the driving history of the user 40 registered with a remote driving service provided by the remote driving managing apparatus 100.

The driving history acquiring unit 104 receives, from the vehicle 400, the driving history of the user 40 recorded by the vehicle 400 during a period during which the user 40 performs the manual driving on the vehicle 400, for example. When the communication terminal 700 of the user 40 manages the driving history of the user 40, the driving history acquiring unit 104 may also receive the driving history of the user 40 from the communication terminal 700. Also, the driving history acquiring unit 104 may also receive the driving history of the user 40 from a management server that manages the driving history of the user 40.

Also, the driving history acquiring unit 104 acquires the driving history of the user of the remote driving apparatus. The driving history acquiring unit 104 may regularly acquire the driving history of the user of the remote driving apparatus registered with the remote driving service provided by the remote driving managing apparatus 100.

The driving history acquiring unit 104 receives, from the remote driving vehicle 300, the driving history of the manual driving of the user 30 recorded by the remote driving vehicle 300 during a period during which the user 30 performs the manual driving on the remote driving vehicle 300, for example. Also, the driving history acquiring unit 104 receives the driving history of the remote driving of the user 30 recorded by the remote driving vehicle 300, the remote driving managing apparatus 100 or the vehicle 400 during a period during which the user 30 performs the remote driving on the vehicle 400 by the remote driving vehicle 300, for example. In a case where the communication terminal 700 of the user 30 manages the driving history of the user 30, the driving history acquiring unit 104 may also receive the driving history of the user 30 from the communication terminal 700. Also, the driving history acquiring unit 104 may also receive the driving history of the user 30 from a management server that manages the driving history of the user 30.

Also, the driving history acquiring unit 104 receives the driving history of the remote driving of the user 20 recorded by the remote driving facility 200, the remote driving managing apparatus 100 or the vehicle 400 during a period during which the user 20 performs the remote driving on the vehicle 400 by the remote driving facility 200, for example. In a case where the communication terminal 700 of the user 20 manages the driving history of the user 20, the driving history acquiring unit 104 may also receive the driving history of the user 20 from the communication terminal 700. Also, the driving history acquiring unit 104 may also receive the driving history of the user 20 from a management server that manages the driving history of the user 20.

The history analyzing unit 106 analyzes the driving history acquired by the driving history acquiring unit 104. The history analyzing unit 106 analyzes the driving history of the user 40 to specify the driving style of the user 40, for example. Also, the history analyzing unit 106 analyzes the driving history of the user of the remote driving apparatus to specify the driving style of the user of the remote driving apparatus, for example.

The attribute indication receiving unit 108 receives an indication of an attribute information type. The attribute indication receiving unit 108 receives one or more attribute indications among a plurality of types of attributes included in the attribute information. The attribute indication receiving unit 108 receives the indications of the attribute information types by the user 40, for example. The attribute indication receiving unit 108 causes a display unit included in the communication terminal 700 of the user 40, or the vehicle 400 to display a list of the attribute information types and receives the indications of the attribute information types from the user 40, for example.

The vehicle information collecting unit 110 collects the vehicle information. The vehicle information collecting unit 110 may receive the vehicle information of the remote driving vehicle 300 from the remote driving vehicle 300. Also, the vehicle information collecting unit 110 may also receive the vehicle information of the remote driving vehicle 300 from the communication terminal 700 of the user 30. The vehicle information collecting unit 110 may receive the vehicle information of the vehicle 400 from the vehicle 400. Also, the vehicle information collecting unit 110 may also receive the vehicle information of the vehicle 400 from the communication terminal 700 of the user 40. Note that the vehicle information collecting unit 110 may also receive the vehicle information of the remote driving vehicle 300 and the vehicle information of the vehicle 400 via the network 80 from a vehicle information management server that manages vehicle information of a plurality of vehicles.

The storage unit 102 may include the vehicle information collected by the vehicle information collecting unit 110 in each registration data. The storage unit 102 may also store the vehicle name correspondence information. The vehicle name correspondence information is information associating vehicle names of vehicles that have the same or similar structures with each other. For example, the vehicle names of the vehicles in an Original Equipment Manufacturing (OEM) relation are associated with each other and registered with the vehicle name correspondence information. Also, for example, the vehicle names of the vehicles that are determined to have similar structures may also be associated with each other and registered with the vehicle name correspondence information. The determination is performed by an administrator and the like of the remote driving managing apparatus 100, for example.

The request information receiving unit 120 receives the request information for requesting for the remote driving of the vehicle 400. The request information receiving unit 120 may receive the request information sent by the communication terminal 700 of the user 40. The request information receiving unit 120 may store the received request information in the storage unit 102.

The information acquiring unit 122 acquires the information stored in the storage unit 102. In a case where the request information receiving unit 120 has received the request information, for example, the information acquiring unit 122 acquires the attribute information of the user 40 of the vehicle 400 that is a target to be remotely driven. Also, the information acquiring unit 122 acquires the attribute information of the user of the remote driving apparatus who can perform the remote driving during a time period indicated by the time information included in the request information among a plurality of users of remote driving apparatuses.

Also, in a case where the request information receiving unit 120 has received the request information, the information acquiring unit 122 acquires the vehicle information of the vehicle 400 that is a target to be remotely driven. When the request information includes vehicle information, the information acquiring unit 122 acquires the vehicle information. When the request information does not include the vehicle information, the information acquiring unit 122 receives the vehicle information from the storage unit 102.

Also, the information acquiring unit 122 acquires vehicle information of a plurality of remote driving vehicles 300. The information acquiring unit 122 acquires the vehicle information of the remote driving vehicle 300 of the user 30 that can perform the remote driving during a time period indicated by the time information included in the request information, among the plurality of remote driving vehicles 300.

The determining unit 124 associates the vehicle 400 with the user of the remote driving apparatus that is to remotely drive the vehicle 400 based on the request information received by the request information receiving unit 120. The determining unit 124 selects, from a plurality of remote driving apparatuses, a user that is to remotely drive the vehicle 400 and associates the user with the vehicle 400 based on one piece of request information received by the request information receiving unit 120, for example. For example, the determining unit 124 selects, as a candidate, from the plurality of users of the remote driving apparatuses, a user that can remotely drive the vehicle 400 during a time period indicated by the time information included in the request information. If there are a plurality of candidates, the determining unit 124 may also select a user that is to remotely drive the vehicle 400 further based on the information acquired by the information acquiring unit 122.

For example, the determining unit 124 selects, from a plurality of users of remote driving apparatuses, an user of the remote driving apparatus that remotely drive the vehicle 400 based on the attribute information of the user 40 acquired by the information acquiring unit 122 and the attribute information of the plurality of users of the remote driving apparatuses.

When the attribute indication receiving unit 108 has received an indication of an attribute information type, the determining unit 124 may select the user of the remote driving apparatus based on the indicated attribute type that is included in the attribute information of the user 40 and the indicated attribute type that is included in the attribute information of the user of the remote driving apparatus. Accordingly, for example, the user of the remote driving apparatus can be selected based on an attribute type on which the user 40 places importance among a plurality of types of attributes.

The determining unit 124 may select one user of a remote driving apparatus based on the attribute information of the user 40 and the attribute information of the plurality of users of remote driving apparatuses. Also, the determining unit 124 may also first select a plurality of users of remote driving apparatuses based on the attribute information of the user 40 and the attribute information of the plurality of users of the remote driving apparatuses, and present the selected users of the remote driving apparatuses to the user 40 as candidates, and select one user of the remote driving apparatus indicated by the user 40 as the user of the remote driving apparatus that is to remotely drive the vehicle 400. Presentation of the candidates to the user 40 and reception of the indication from the user 40 may be performed via the vehicle 400 or the communication terminal 700 of the user 40.

For example, the determining unit 124 selects the user of the remote driving apparatus having the indicated information among the basic information and that matches the indicated information among the basic information of the user 40. The determining unit 124 selects the user of the remote driving apparatus whose age matches the age of the user 40, for example. Also, the determining unit 124 selects the user of the remote driving apparatus whose gender matches the gender of the user 40, for example. When the age and the gender are the same, a possibility that the driving characteristics are also similar to each other is relatively higher. Accordingly, the user of the remote driving apparatus who has the driving characteristic similar to the driving characteristic of the user 40 can remotely drive the vehicle 400 of the user 40.

The determining unit 124 selects the user of the remote driving apparatus whose driving style matches the driving style of the user 40, for example. Also, the determining unit 124 selects the user of the remote driving apparatus whose driving style similar to the driving style of the user 40, for example.

The determining unit 124 selects the user of the remote driving apparatus who has a tendency of the driving speed matches the tendency of the driving speed of the user 40, for example. Also, the determining unit 124 selects the user of the remote driving apparatus who has a tendency of the driving speed similar to the tendency of the driving speed of the user 40, for example. That the tendencies of the driving speeds are similar may mean that the levels of the driving speeds are adjacent levels such as the level "slight fast" and the level "fast", for example. Accordingly, the user of the remote driving apparatus who drives at a driving speed that possibly makes the user 40 feel less uncomfortable can remotely drive the vehicle 400 of the user 40.

Also, the determining unit 124 selects the user of the remote driving apparatus who has a tendency of the number of times of acceleration/deceleration matches the tendency of the number of times of acceleration/deceleration of the user 40, for example. Also, the determining unit 124 selects the user of the remote driving apparatus who has a tendency of the number of times of acceleration/deceleration similar to the tendency of the number of times of acceleration/deceleration of the user 40, for example. That the tendencies of the number of times of acceleration/deceleration are similar may mean that the levels of the number of times of acceleration/deceleration are adjacent levels such as the level "slightly large" and the level "large", for example. Accordingly, the user of the remote driving apparatus whose roughness of driving or a degree of safety driving matches that of the user 40 can remotely drive the vehicle 400 of the user 40.

Also, the determining unit 124 selects the user of the remote driving apparatus having a bypath utilization tendency that matches the bypath utilization tendency of the user 40, for example. Also, the determining unit 124 selects the user of the remote driving apparatus having a bypath utilization tendency that is similar to the bypath utilization tendency of the user 40, for example. That the bypath utilization tendencies are similar may mean that the levels of the bypath utilization tendencies are adjacent levels such as the level "slightly high" and the level "high", for example. Accordingly, for the user 40 who rarely utilizes a bypath and prefers to travel a main street, the user of the remote driving apparatus who often utilizes a bypath can be prevented from being selected. Also, for the user 40 who often utilizes a bypath, the user of the remote driving apparatus who travels on a main street only can be prevented from being selected.

Also, the determining unit 124 selects the user of the remote driving apparatus having a side trip tendency that matches the side trip tendency of the user 40, for example. Also, the determining unit 124 selects the user of the remote driving apparatus having a side trip tendency that is similar to the side trip tendency of the user 40, for example. That the side trip tendencies are similar may mean that the levels of the number of times of the side trip are adjacent levels such as the level "slightly high" and the level "high", for example. Accordingly, when the user 40 is a person who often takes a side trip and is a person who also prefers to take a side trip at the time of remote driving, a user of a remote driving apparatus who has got used to a side trip can remotely drive the vehicle 400 of the user 40.

The determining unit 124 selects the user of the remote driving apparatus having a driving history that matches the driving history of the user 40, for example. Also, the determining unit 124 selects the user of the remote driving apparatus having a driving style similar to the driving history of the user 40, for example.

The determining unit 124 selects the user of the remote driving apparatus having a travelling area tendency that matches the travelling area tendency of the user 40, for example. Accordingly, for example, the user of the remote driving apparatus who is familiar with geography of an area in which the vehicle 400 is to be remotely driven can remotely drive the vehicle 400. Also, the determining unit 124 selects the user of the remote driving apparatus having a travelling time tendency that matches the travelling time tendency of the user 40, for example. Also, the determining unit 124 selects the user of the remote driving apparatus having a destination tendency that matches the destination tendency of the user 40, for example. Accordingly, for example, when the user 40 is a person who often visits a ramen restaurant, a user of a remote driving apparatus who is with the large number of times of movements to a ramen restaurant by a vehicle and who is familiar with ramen restaurants that can be visited by a vehicle can remotely drive the vehicle 400 of the user 40.

The determining unit 124 may select the user of the remote driving apparatus by combining a plurality of the above-described conditions. Accordingly, from a plurality of viewpoints, the user of the remote driving apparatus who is suitable for the user 40 can remotely drive the vehicle 400 of the user 40.

The determining unit 124 compares the vehicle information of the vehicle 400 acquired by the information acquiring unit 122 to the vehicle information of the plurality of remote driving vehicles 300, and selects the user 30 who is to remotely drive the vehicle 400 based on a comparison result. The determining unit 124 may select one user 30 based on the comparison result. Also, the determining unit 124 may also first select the plurality of users 30 based on the comparison result, present the selected users 30 as candidates to the user 40, and select one user 30 indicated by the user 40 as the user 30 who is to remotely drive the vehicle 400. The presentation of the candidates to the user 40 and the reception of the indication from the user 40 may be performed via the vehicle 400 or the communication terminal 700 of the user 40.

The determining unit 124 may select the user 30 based on the vehicle name of the vehicle 400 and the vehicle names of the plurality of remote driving vehicles 300. For example, the determining unit 124 selects the user 30 of the remote driving vehicle 300 whose vehicle name matching the vehicle name of the vehicle 400. Also, for example, the determining unit 124 selects the user 30 of the remote driving vehicle 300 including a part of the vehicle name of the vehicle 400. Also, for example, the determining unit 124 selects the user 30 of the remote driving vehicle 300 whose vehicle name has a higher matching degree with the vehicle name of the vehicle 400 than a threshold. The matching degree of the vehicle names may be calculated by any calculation method. For example, the matching degree of the vehicle names may be a matching degree of strings of the vehicle names. The threshold may be arbitrarily determined, and may also be changeable. Also, for example, the determining unit 124 may also refer to vehicle name correspondence information stored in the storage unit 102 and select the user 30 of the remote driving vehicle 300 who has the vehicle name corresponding to the vehicle name of the vehicle 400.

The determining unit 124 may also select the user 30 based on the vehicle name and the specification of the vehicle 400, and the vehicle names and the specifications of a plurality of remote driving vehicles 300. For example, the determining unit 124 selects the user 30 of the remote driving vehicle 300 having the matched specification among the remote driving vehicles 300 selected based on the vehicle names as described above. Also, for example, the determining unit 124 calculates a matching degree between the specification of the vehicle 400 and the specification of each of the remote driving vehicles 300 selected based on the vehicle names, and selects the user 30 of the remote driving vehicle 300 based on the matching degree. The matching degree of the specifications may be calculated by any calculation method. For example, a similarity degree of the specifications may be a matching degree of the strings of the specifications. The determining unit 124 selects the user 30 of the remote driving vehicle 300 having the maximum matching degree, for example.

The determining unit 124 may also select the user 30 based on the equipment information of the vehicle 400 and the equipment information of the plurality of remote driving vehicles 300. For example, the determining unit 124 selects the user 30 of the remote driving vehicle 300 having the equipment information that matches the equipment information of the vehicle 400. Also, for example, the determining unit 124 calculates the matching degree between the equipment information of the vehicle 400 and the equipment information of the plurality of remote driving vehicles 300, and selects the user 30 of the remote driving vehicle 300 based on the matching degree. The matching degree of the equipment information may be calculated by any calculation method. For example, the matching degree of the equipment information may be a ratio of the number of the equipment which matches the equipment of the remote driving vehicle 300 among the equipment of the vehicle 400, to the number of the equipment of the vehicle 400. For example, when the number of the equipment of the vehicle 400 is 10, and 8 pieces of the equipment among the equipment of the vehicle 400 match the equipment of the remote driving vehicle 300, the matching degree is 80%.

The determining unit 124 may also select the user 30 based on the vehicle name and the equipment information of the vehicle 400, and the vehicle names and the equipment information of the plurality of remote driving vehicles 300. Also, the determining unit 124 may also select the user 30 based on the vehicle name, the specification and the equipment information of the vehicle 400, and the vehicle names, the specifications and the equipment information of the plurality of remote driving vehicles 300.

Also, with respect to one user of one remote driving apparatus among the plurality of remote driving apparatuses registered with the remote driving service, the determining unit 124 may also select, based on a plurality of pieces of request information received by the request information receiving unit 120, one vehicle 400 from among a plurality of vehicles 400 and associate the selected vehicle 400 with the user of the remote driving apparatus. The determining unit 124 specifies, as a candidate from the plurality of vehicles 400, the vehicle 400 whose time information included in the request information is included in the time period, during which the remote driving can be performed, of the one user of the one remote driving apparatus, for example. When there are a plurality of candidates, the determining unit 124 may also select the vehicle 400 that is to be remotely driven by the one user of the one remote driving apparatus further based on the information acquired by the information acquiring unit 122.

For example, the determining unit 124 selects, from among the plurality of vehicles 400, the vehicle 400 that is to be remotely driven by one user of one remote driving apparatus based on the attribute information of the one user of the one remote driving apparatus, and the attribute information of the plurality of users 40 of the vehicles 400. The selection method may be similar to the above-described method of selecting, from among the plurality of users of the remote driving apparatuses, the user of the remote driving apparatus who is to remotely drive the vehicle 400.

When the remote driving apparatus is the remote driving vehicle 300, the determining unit 124 may compare the vehicle information of the remote driving vehicle 300 acquired by the information acquiring unit 122 to the vehicle information of the plurality of vehicles 400, and select the vehicle 400 that is to be remotely driven by one user 30 of one remote driving vehicle 300 based on the comparison result. The selection method may be similar to the above-described method of comparing the vehicle information of the vehicle 400 acquired by the information acquiring unit 122 to the vehicle information of the plurality of remote driving vehicles 300, and selecting the user 30 who is to remotely drive the vehicle 400 based on the comparison result.

The key data generating unit 126 generates the key data. The key data generating unit 126 generates, based on the identification information of the vehicle 400 that is a target to be remotely driven, the key data for enabling to remotely drive the vehicle 400 via the remote driving apparatus corresponding to the vehicle 400. For example, the key data generating unit 126 may generate, based on the identification information of the vehicle 400 that is a target to be remotely driven, the key data for enabling to remotely drive the vehicle 400 via the remote driving apparatus of the user associated with the vehicle 400 by the determining unit 124. The key data generating unit 126 generates the key data that is valid only once, for example.

The key data sending unit 128 sends the key data generated by the key data generating unit 126, to the communication terminal 700 of the user of the remote driving apparatus associated, by the determining unit 124, with the vehicle 400 that is the target to be remotely driven.

Figure 9:
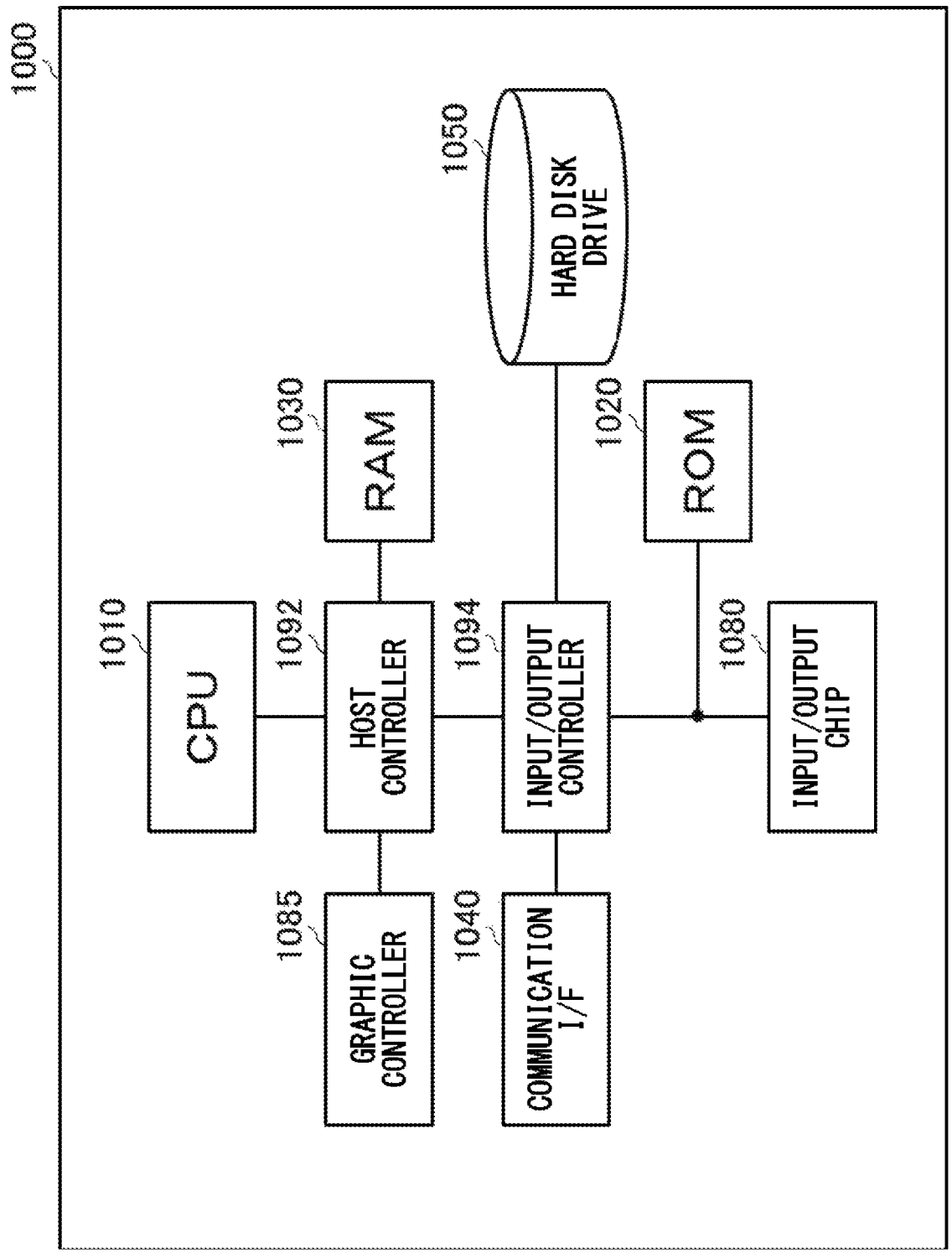
FIG. 9 schematically shows one example of a hardware configuration of a computer 1000 that functions as the remote driving managing apparatus 100.

FIG. 9 schematically shows one example of a hardware configuration of a computer 1000 that functions as the remote driving managing apparatus 100. The computer 1000 according to the present embodiment includes a CPU peripheral unit having a CPU 1010, a RAM 1030 and a graphic controller 1085 that are mutually connected by a host controller 1092, and an input/output unit having a ROM 1020, a communication I/F 1040, a hard disk drive 1050 and an input/output chip 1080 that are connected to the host controller 1092 by an input/output controller 1094.

The CPU 1010 operates based on programs stored in the ROM 1020 and the RAM 1030 to perform control on each unit. The graphic controller 1085 acquires image data generated by the CPU 1010 and the like on a frame buffer provided within the RAM 1030, and displays the image data on a display. Instead of this, the graphic controller 1085 may also include the frame buffer that stores the image data generated by the CPU 1010 and the like therein.

The communication I/F 1040 communicates with another apparatus via a wired or wireless network. Also, the communication I/F 1040 functions as hardware performing communications. The hard disk drive 1050 stores programs and data that are used by the CPU 1010.

The ROM 1020 stores a boot program that is executed when the computer 1000 runs, and a program and the like depending on the hardware of the computer 1000. The input/output chip 1080 connects various input/output devices to the input/output controller 1094 via a parallel port, a serial port, a keyboard port, a mouse port and the like, for example.

A program provided to the hard disk drive 1050 via the RAM 1030 is stored in a recording medium such as an IC card and is provided to a user.

The program is read from the recording medium, installed in the hard disk drive 1050 via the RAM 1030, and executed on the CPU 1010.

A program that is installed in the computer 1000 and that causes the computer 1000 to function as the remote driving managing apparatus 100 may work on the CPU 1010 and the like to cause the computer 1000 to respectively function as each unit of the remote driving managing apparatus 100. The information processing described in these programs function, by being read by the computer 1000, as the storage unit 102, the driving history acquiring unit 104, the history analyzing unit 106, the attribute indication receiving unit 108, the vehicle information collecting unit 110, the request information receiving unit 120, the information acquiring unit 122, the determining unit 124, the key data generating unit 126 and the key data sending unit 128 that are specific means on which software and the above-described various hardware resources cooperate with each other.

Then, by implementing, by these specific means, an information operation or processing in accordance with a purpose of usage of the computer 1000 in the present embodiment, a specific remote driving managing apparatus 100 in accordance with the purpose of usage is constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . remote driving system; 20 . . . user; 30 . . . user; 40 . . . user; 80 . . . network; 100 . . . remote driving managing apparatus; 102 . . . storage unit; 104 . . . driving history acquiring unit; 106 . . . history analyzing unit; 108 . . . attribute indication receiving unit; 110 . . . vehicle information collecting unit; 120 . . . request information receiving unit; 122 . . . information acquiring unit; 124 . . . determining unit; 126 . . . key data generating unit; 128 . . . key data sending unit; 200 . . . remote driving facility; 214 . . . steering wheel; 216 . . . pedal; 218 . . . display unit; 220 . . . control unit; 230 . . . key data reading unit; 240 . . . wireless communication unit; 250 . . . display control unit; 260 . . . manipulation contents acquiring unit; 300 . . . remote driving vehicle; 310 . . . control unit; 312 . . . key data acquiring unit; 314 . . . connection establishing unit; 316 . . . control signal sending unit; 320 . . . manipulation contents acquiring unit; 330 . . . key data reading unit; 340 . . . wireless communication unit; 350 . . . display control unit; 400 . . . vehicle; 402 . . . manipulation contents acquiring unit; 412 . . . image capturing unit; 414 . . . radar apparatus; 416 . . . LIDAR; 418 . . . object recognizing unit; 420 . . . image acquiring unit; 430 . . . wireless communication unit; 440 . . . vehicle control unit; 700 . . . communication terminal; 1000 . . . computer; 1010 . . . CPU; 1020 . . . ROM; 1030 . . . RAM; 1040 . . . communication/F; 1050 . . . hard disk drive; 1080 . . . input/output chip; 1085 . . . graphic controller; 1092 . . . host controller; 1094 . . . input/output controller

What is claimed is:

1. A remote driving managing apparatus comprising:
   a request information receiving unit configured to receive, from a mobile communication terminal of a user of a vehicle, request information for requesting for remote driving of the vehicle;
   a determining unit configured to associate the vehicle with a user of a remote driving apparatus that is to remotely drive the vehicle based on the request information;
   a key data generating unit configured to generate, based on vehicle identification information for identifying the vehicle, key data for enabling to remotely drive the vehicle via the remote driving apparatus of the user who is associated with the vehicle by the determining unit; and
   a key data sending unit configured to send the key data to a mobile communication terminal of the user who is associated with the vehicle by the determining unit.

2. The remote driving managing apparatus according to claim 1, wherein the key data generating unit generates the key data that is valid only once.

3. The remote driving managing apparatus according to claim 1, comprising an attribute information acquiring unit configured to acquire attribute information of the user of the vehicle and attribute information of the user of the remote driving apparatus, wherein
the determining unit associates, by selecting a user who is to remotely drive the vehicle based on the attribute information acquired by the attribute information acquiring unit, the vehicle with the user of the remote driving apparatus.

4. The remote driving managing apparatus according to claim 3, wherein
the attribute information of the user of the vehicle includes an age of the user of the vehicle,
the attribute information of the user of the remote driving apparatus includes an age of the user of the remote driving apparatus, and
the determining unit selects the user of the remote driving apparatus whose age matches the age of the user of the vehicle.

5. The remote driving managing apparatus according to claim 3, wherein
the attribute information of the user of the vehicle includes a gender of the user of the vehicle,
the attribute information of the user of the remote driving apparatus includes a gender of the user of the remote driving apparatus, and
the determining unit selects the user of the remote driving apparatus whose age matches an age of the user of the vehicle.

6. The remote driving managing apparatus according to claim 3, wherein
the attribute information of the user of the vehicle includes a driving style of the user of the vehicle,
the attribute information of the user of the remote driving apparatus includes a driving style of the user of the remote driving apparatus, and
the determining unit selects the user of the remote driving apparatus whose driving style matches the driving style of the user of the vehicle, or the user of the remote driving apparatus whose driving style is similar to the driving style of the user of the vehicle.

7. The remote driving managing apparatus according to claim 6, wherein
the driving style indicates at least any one of a driving speed tendency, a tendency of a number of times of acceleration/deceleration, a bypath utilization tendency and a side trip tendency.

8. The remote driving managing apparatus according to claim 3, wherein
the attribute information of the user of the vehicle includes a driving history of the user of the vehicle,
the attribute information of the user of the remote driving apparatus includes a driving history of the user of the remote driving apparatus, and
the determining unit selects the user of the remote driving apparatus whose driving history matches the driving history of the user of the vehicle, or the user of the remote driving apparatus whose driving history is similar to the driving history of the user of the vehicle.

9. The remote driving managing apparatus according to claim 8, wherein
the driving history includes at least any one of a history of an area in which a vehicle is driven and travels, a history of a time period during which a vehicle is driven and travels, and a history of a destination to which a vehicle is driven and moved.

10. The remote driving managing apparatus according to claim 3, comprising
an attribute indication receiving unit configured to receive an indication of an attribute information type, wherein
the determining unit selects the user who remotely drives the vehicle based on the indicated attribute type that is included in the attribute information of the user of the vehicle, and the indicated attribute type that is included in the attribute information of the user of the remote driving apparatus.

11. The remote driving managing apparatus according to claim 1, wherein
the remote driving apparatus is a remote driving vehicle that has a function of remotely driving the vehicle,
the remote driving managing apparatus comprises a vehicle information acquiring unit configured to acquire first vehicle information that is information of the vehicle, and second vehicle information that is information of the remote driving vehicle, and
the determining unit associates the vehicle with a user of the remote driving vehicle by selecting a user, who is to remotely drive the vehicle, based on the first vehicle information and the second vehicle information.

12. The remote driving managing apparatus according to claim 11, wherein
the first vehicle information includes a vehicle name of the vehicle,
the second vehicle information includes a vehicle name of the remote driving vehicle, and
the determining unit selects a user of the remote driving vehicle with a vehicle name having a higher matching degree with the vehicle name of the vehicle than a predetermined threshold.

13. The remote driving managing apparatus according to claim 12, wherein
the first vehicle information includes a vehicle name of the vehicle and a specification of the vehicle,
the second vehicle information includes a vehicle name of the remote driving vehicle and a specification of the remote driving vehicle, and
the determining unit selects a user of the remote driving vehicle based on a matching degree between the specification of the vehicle and a specification of each remote driving vehicle selected based on the vehicle name of the vehicle.

14. The remote driving managing apparatus according to claim 11, wherein
the first vehicle information includes equipment information that indicates equipment of the vehicle,
the second vehicle information includes equipment information that indicates equipment of the remote driving vehicle, and
the determining unit selects a user of the remote driving vehicle based on the equipment information of the vehicle and the equipment information of the remote driving vehicle.

15. A non-transitory computer-readable storage medium that stores a program for causing a computer to function as:
a request information receiving unit configured to receive, from a mobile communication terminal of a user of a vehicle, request information for requesting for remote driving of the vehicle;
a determining unit configured to associate the vehicle with a user of a remote driving apparatus that is to remotely drive the vehicle based on the request information;
a key data generating unit configured to generate, based on vehicle identification information for identifying the vehicle, key data for enabling to remotely drive the vehicle via the remote driving apparatus of the user who is associated with the vehicle by the determining unit; and a key data sending unit configured to send the key data to a mobile communication terminal of the user who is associated with the vehicle by the determining unit.

16. A remote driving system comprising:
the remote driving managing apparatus according to claim 1;
the remote driving apparatus; and
the vehicle, wherein
the remote driving apparatus has:
 a key data acquiring unit configured to acquire the key data from the mobile communication terminal of the user of the remote driving apparatus associated with the vehicle by the determining unit;
 a connection establishing unit configured to establish a connection between the remote driving apparatus and the vehicle by using the key data; and
 a control signal sending unit configured to send, to the vehicle, a control signal based on remote driving through the connection with the vehicle.

17. The remote driving system according to claim 16, wherein the key data acquiring unit receives the key data according to short-range radio communication from the mobile communication terminal of the user.

18. The remote driving managing apparatus according to claim 1, wherein a connection is established between the remote driving apparatus and the vehicle in response to the vehicle receiving the key data.

19. The non-transitory computer-readable storage medium according to claim 15, wherein a connection is established between the remote driving apparatus and the vehicle in response to the vehicle receiving the key data.

* * * * *